US012782955B2

(12) United States Patent
Song et al.

(10) Patent No.: US 12,782,955 B2
(45) Date of Patent: Nov. 3, 2026

(54) POSITIONING METHOD AND APPARATUS, DEVICE, SYSTEM, AND STORAGE MEDIUM

(71) Applicant: HEMA (CHINA) CO., LTD., Shanghai (CN)

(72) Inventors: Enliang Song, Shanghai (CN); Yingzhi Yu, Hangzhou (CN); Zhenyu Zhao, Shanghai (CN)

(73) Assignee: HEMA (CHINA) CO., LTD., Shanghai (CN)

( * ) Notice: Subject to any disclaimer, the term of this patent is extended or adjusted under 35 U.S.C. 154(b) by 381 days.

(21) Appl. No.: 18/293,709

(22) PCT Filed: Jul. 29, 2022

(86) PCT No.: PCT/CN2022/108969
§ 371 (c)(1),
(2) Date: Jan. 30, 2024

(87) PCT Pub. No.: WO2023/006066
PCT Pub. Date: Feb. 2, 2023

(65) Prior Publication Data

US 2024/0419184 A1 Dec. 19, 2024

(30) Foreign Application Priority Data

Jul. 30, 2021 (CN) ......................... 202110874039.6

(51) Int. Cl.
*G05D 1/247* (2024.01)
*G01C 21/20* (2006.01)
(Continued)

(52) U.S. Cl.
CPC ........... *G05D 1/247* (2024.01); *G01C 21/206* (2013.01); *G05D 1/648* (2024.01); *H04W 4/021* (2013.01); *G05D 2107/40* (2024.01)

(58) Field of Classification Search
CPC .... G05D 1/247; G05D 1/648; G05D 2107/40; G01C 21/206; H04W 4/021; G06Q 10/087
See application file for complete search history.

(56) References Cited

U.S. PATENT DOCUMENTS 10,136,259 B1 * 11/2018 Todeschini ............ H04W 4/025
2020/0065748 A1 * 2/2020 Durkee .............. G06Q 30/0639
(Continued)

FOREIGN PATENT DOCUMENTS

CN 102163294 A 8/2011
CN 108616811 A 10/2018
(Continued)

OTHER PUBLICATIONS

Bilbao-Jayo, Aritz, et al. "Behavior modeling for a beacon-based indoor location system." Sensors 21.14 (2021): 4839. (Year: 2021).*
(Continued)

*Primary Examiner* — Nathan A Mitchell
(74) *Attorney, Agent, or Firm* — Wolf, Greenfield & Sacks, P.C.

(57) ABSTRACT

A positioning method and apparatus, a device, a system, and a storage medium are provided, to reduce power consumption of a device. The system comprises: a task management platform, a shelf label management platform, a terminal device, electronic shelf labels and a positioning server. The task management platform determines (202) a target task and task information of the target task; generates (204) task processing information according to the task information, sends the task processing information to the shelf label management platform and the terminal device. The shelf label management platform controls (206), according to the task processing information, an electronic shelf label in a positioning area to transmit a beacon signal. The terminal device receives (208), in the positioning area, signal data of
(Continued)

the beacon signal; sends (210) the signal data of the beacon signal to the positioning server. The positioning server performs (212) positioning according to the signal data to determine location information of the terminal device; sends (214) the location information to the task management platform. The task management platform determines (216) task execution information of the target task according to the location information.

19 Claims, 4 Drawing Sheets

(51) Int. Cl.

| | |
|---|---|
| ***G05D 1/648*** | (2024.01) |
| ***G05D 107/40*** | (2024.01) |
| ***H04W 4/021*** | (2018.01) |

(56) References Cited

U.S. PATENT DOCUMENTS

| | | | | |
|---|---|---|---|---|
| 2020/0132470 | A1* | 4/2020 | Xu | G06Q 30/0643 |
| 2020/0250610 | A1* | 8/2020 | Schoening | G06K 19/07749 |
| 2020/0302510 | A1 | 9/2020 | Chachek et al. | |
| 2021/0004756 | A1* | 1/2021 | Kulkarni Wadhonkar | G06V 20/52 |
| 2022/0051310 | A1* | 2/2022 | Graube | G06Q 10/087 |
| 2024/0331016 | A1* | 10/2024 | Filali Ansary | G06Q 10/08 |

FOREIGN PATENT DOCUMENTS

| | | | | | |
|---|---|---|---|---|---|
| CN | 109326141 | A | | 2/2019 | |
| CN | 109547535 | A | | 3/2019 | |
| CN | 110020707 | A | | 7/2019 | |
| CN | 111814926 | A | | 10/2020 | |
| CN | 111935819 | A | | 11/2020 | |
| CN | 112468953 | A | | 3/2021 | |
| CN | 112529489 | A | * | 3/2021 | G06Q 10/087 |
| CN | 112565376 | A | | 3/2021 | |
| CN | 113163345 | A | | 7/2021 | |
| CN | 113739787 | A | | 12/2021 | |
| EP | 2 728 539 | A1 | | 5/2014 | |
| JP | 2016-57684 | A | | 4/2016 | |
| KR | 10-2019-0016016 | A | | 2/2019 | |
| WO | 2010/137883 | A2 | | 12/2010 | |
| WO | WO 2017/109962 | A1 | | 6/2017 | |
| WO | WO 2018/047854 | A1 | | 3/2018 | |
| WO | WO 2019/031264 | A1 | | 2/2019 | |
| WO | WO 2020/036864 | A1 | | 2/2020 | |
| WO | WO 2020/181066 | A1 | | 9/2020 | |

OTHER PUBLICATIONS

Zadgaonkar, Hrushikesh, and Manoj Chandak. "Locating objects in warehouses using ble beacons & machine learning." IEEE Access 9 (2021): 153116-153125. (Year: 2021).*

Extended European Search Report dated Sep. 2, 2025, in connection with European Application No. 22848670.0.

Japanese Notice of Reasons for Refusal drafted Oct. 25, 2024, in connection with Japanese Application No. 2024-505547, with English translation thereof.

Chinese Office Action dated Dec. 6, 2023, in connection with Chinese Application No. 202110874039.6.

International Search Report dated Sep. 28, 2022, in connection with International Application No. PCT/CN2022/108969.

* cited by examiner

POSITIONING METHOD AND APPARATUS, DEVICE, SYSTEM, AND STORAGE MEDIUM

The present disclosure is a national stage filing under 35 U.S.C. 371 of International Patent Application Serial No. PCT/CN2022/108969, filed Jul. 29, 2022, entitled "POSITIONING METHOD AND APPARATUS, DEVICE, SYSTEM, AND STORAGE MEDIUM" which claims priority to Chinese patent application No. CN202110874039.6, filed with the China Patent Office on Jul. 30, 2021 and entitled "POSITIONING METHOD AND APPARATUS, DEVICE, SYSTEM, AND STORAGE MEDIUM". The entire contents of these applications are incorporated herein by reference in their entirety.

TECHNICAL FIELD

The present application relates to the field of computer technology, and in particular to a positioning method, apparatus and system, an electronic device, and a storage medium.

BACKGROUND

Indoor positioning refers to location positioning achieved in an indoor environment. Since satellite positioning is affected significantly by buildings or the like, rendering the precision of indoor positioning not sufficient, indoor positioning will be usually performed based on other wireless ways.

At present, in an indoor scenario such as a department store or a supermarket, the environment is relatively complex, and indoor positioning requirements are relatively high. In an indoor environment, signals may be transmitted by deploying beacons or in other ways, thereby performing positioning. However, devices such as beacons are usually powered by batteries, and this positioning way also results in high power consumption and requires replacement of batteries or beacon devices frequently.

SUMMARY

An embodiment of the present application provides a positioning method to reduce the power consumption of a device.

Correspondingly, embodiments of the present application further provide a positioning apparatus, a positioning system, an electronic device, and a storage medium to ensure the implementation and application of the above method.

In order to solve the above problem, an embodiment of the present application discloses a positioning system, comprising: a task management platform, a shelf label management platform, a terminal device, electronic shelf labels and a positioning server; wherein the task management platform determines a target task and task information of the target task; the task management platform generates task processing information according to the task information, and sends the task processing information to the shelf label management platform and the terminal device; the shelf label management platform controls, according to the task processing information, an electronic shelf label in a positioning area to transmit a beacon signal; the terminal device receives, in the positioning area, signal data of the beacon signal; the terminal device sends the signal data of the beacon signal to the positioning server; the positioning server performs positioning according to the signal data to determine location information of the terminal device; the positioning server sends the location information to the task management platform; and the task management platform determines task execution information of the target task according to the location information.

An embodiment of the present application further discloses a positioning method, comprising: determining a target task and task information of the target task; generating task processing information according to the task information, and sending the task processing information; receiving location information of a terminal device, the location information being determined by the terminal device by scanning a beacon signal of an electronic shelf label in a positioning area, and the positioning area being determined according to the task processing information; and determining task execution information of the target task according to the location information.

Optionally, the determining the target task and the task information of the target task comprises: acquiring the target task; determining at least one commodity object corresponding to the target task, and generating the task information based on the at least one commodity object.

Optionally, the generating the task information based on the at least one commodity object comprises: acquiring commodity information and location information of each of the at least one commodity object; planning a task path for the target task according to the location information of each of the at least one commodity object, and determining corresponding operation information; and determining corresponding task information according to the commodity information, the location information of each of the at least one commodity object, the task path, and the operation information.

Optionally, generating the task processing information according to the task information, and sending the task processing information comprises: generating positioning execution information according to the task information, and sending the positioning execution information to the terminal device; generating shelf label control information according to the task information, and sending the shelf label control information to a shelf label management platform; and sending the task information to the shelf label management platform and the terminal device.

Optionally, the generating the positioning execution information according to the task information comprises: determining a corresponding operation point on a task path according to location information of a commodity object; determining operation time and operation content corresponding to the operation point according to operation information; and generating the positioning execution information according to the operation point on the task path, the operation time, and the operation content.

Optionally, the generating the shelf label control information according to the task information comprises: determining a positioning point on a task path according to an operation point on the task path; determining a positioning time period corresponding to the positioning point, according to operation time corresponding to the operation point; and generating, according to the positioning point on the task path and the positioning time period, the shelf label control information.

Optionally, the generating the shelf label control information according to the task information comprises: determining a corresponding positioning point on a task path according to location information of a commodity object; determining a positioning time period corresponding to the positioning point according to operation information; and generating, according to the positioning point on the task path and the positioning time period, the shelf label control information.

Optionally, the step of determining the positioning point on the task path comprises: on condition that a plurality of operation points or location information of a plurality of commodity objects are in one positioning area, merging the plurality of operation points.

Optionally, the method further comprises: determining time information corresponding to the location information; determining staying time of the terminal device in a corresponding positioning area according to the time information; and recording the staying time.

Optionally, the method further comprises: generating warning information on condition that it is detected that staying time of the terminal device in the positioning area exceeds a staying threshold.

An embodiment of the present application further discloses a positioning method, comprising: receiving task processing information of a target task; determining a positioning area according to the task processing information; determining an electronic shelf label group according to the positioning area, controlling an electronic shelf label in the electronic shelf label group to send a beacon signal to position, according to the beacon signal, location information of a terminal device, and determining task execution information of the target task according to the location information.

Optionally, the task processing information comprises shelf label control information; and the determining the positioning area according to the task processing information comprises: determining a positioning point on a task path according to the task processing information; and determining the positioning area according to the positioning point.

Optionally, determining the electronic shelf label group according to the positioning area comprises: selecting a plurality of electronic shelf labels in the positioning area to form the electronic shelf label group.

Optionally, the controlling the electronic shelf label in the electronic shelf label group to send the beacon signal comprises: determining a positioning time period corresponding to the positioning point; and controlling, within the positioning time period, the plurality of electronic shelf labels to send beacon signals.

Optionally, controlling the electronic shelf label in the electronic shelf label group to send the beacon signal comprises: receiving a positioning completion indication corresponding to a target operation point; and sending a positioning activation indication to an electronic shelf label group in a positioning area corresponding to a next operation point, and controlling an electronic shelf label in the electronic shelf label group to send a beacon signal.

An embodiment of the present application further discloses a positioning method, comprising: receiving task processing information of a target task; displaying the target task according to the task processing information; scanning, on condition that an operation point is reached, beacon signals of electronic shelf labels, and receiving signal data, the electronic shelf labels comprising a plurality of electronic shelf labels in an electronic shelf label group in a positioning area; and sending the signal data to determine, according to the signal data, location information and reporting the location information, and determining task execution information of the target task according to the location information.

Optionally, the task processing information comprises positioning execution information, and the displaying the target task according to the task processing information comprises: displaying, according to the positioning execution information, an operation point, commodity information, and operation content.

Optionally, the method further comprises: determining location information of a terminal device according to positioning data; and sending the location information of the terminal device.

Optionally, the method further comprises: sending a positioning completion indication after completing a corresponding task at the operation point.

Optionally, the method further comprises: acquiring and displaying reminder information, the reminder information comprising operation reminder information and/or warning information.

An embodiment of the present application further discloses a positioning method, comprising: receiving signal data of a terminal device, the signal data being acquired by the terminal device by scanning beacon signals of electronic shelf labels at an operation point, and the electronic shelf labels comprising a plurality of electronic shelf labels in an electronic shelf label group in a positioning area; performing positioning processing according to the signal data and location information of a corresponding electronic shelf label to determine location information of the terminal device; and sending the location information to determine task execution information of a target task according to the location information.

An embodiment of the present application further discloses a positioning system, comprising: a task management platform, a shelf label management platform, a terminal device, electronic shelf labels and a positioning server; wherein the task management platform determines a target task and task information of the target task; generates task processing information according to the task information, and sends the task processing information to the shelf label management platform and the terminal device; and determines task execution information of the target task according to the location information; the shelf label management platform controls, according to the task processing information, an electronic shelf label in a positioning area to transmit a beacon signal; the terminal device receives, in the positioning area, signal data of the beacon signal; and sends the signal data of the beacon signal to the positioning server; and the positioning server performs positioning according to the signal data to determine location information of the terminal device; and sends the location information to the task management platform.

An embodiment of the present application further discloses a positioning apparatus applied to a task management platform, comprising: a task determination module, configured for determining a target task and task information of the target task; a task distribution module, configured for generating task processing information according to the task information, and sending the task processing information; a location receiving module, configured for receiving location information of a terminal device, the location information being determined by the terminal device by scanning a beacon signal of an electronic shelf label in a positioning area, and the positioning area being determined according to the task processing information; and a task result module, configured for determining task execution information of the target task according to the location information.

Optionally, the task determination module is configured for acquiring the target task; determining at least one commodity object corresponding to the target task, and generating the task information based on the at least one commodity object.

Optionally, the task determination module is configured for acquiring commodity information and location information of each of the at least one commodity object; planning a task path for the target task according to the location information of each of the at least one commodity object, and determining corresponding operation information; and determining corresponding task information according to the commodity information, the location information of each of the at least one commodity object, the task path, and the operation information.

Optionally, the task distribution module is configured for generating positioning execution information according to the task information, and sending the positioning execution information to the terminal device; generating shelf label control information according to the task information, and sending the shelf label control information to a shelf label management platform; and sending the task information to the shelf label management platform and the terminal device.

Optionally, the task distribution module is configured for determining a corresponding operation point on a task path according to location information of a commodity object; determining operation time and operation content corresponding to the operation point according to operation information; and generating the positioning execution information according to the operation point on the task path, the operation time, and the operation content.

Optionally, the task distribution module is configured for determining a positioning point on a task path according to an operation point on the task path; determining a positioning time period corresponding to the positioning point, according to operation time corresponding to the operation point; and generating, according to the positioning point on the task path and the positioning time period, the shelf label control information.

Optionally, the task distribution module is configured for determining a corresponding positioning point on a task path according to location information of a commodity object; determining a positioning time period corresponding to the positioning point according to operation information; and generating, according to the positioning point on the task path and the positioning time period, the shelf label control information.

Optionally, the task distribution module is configured for merging a plurality of operation points on condition that the plurality of operation points or location information of a plurality of commodity objects are in one positioning area.

Optionally, the task result module is further configured for determining time information corresponding to the location information; determining staying time of the terminal device in a corresponding positioning area according to the time information; and recording the staying time.

Optional, the task result module is further configured for generating warning information on condition that it is detected that staying time of the terminal device in the positioning area exceeds a staying threshold.

An embodiment of the present application further discloses a positioning apparatus applied to a shelf label management platform, comprising:

a task receiving module, configured for receiving task processing information of a target task; and a positioning control module, configured for determining a positioning area according to the task processing information; determining an electronic shelf label group according to the positioning area, controlling an electronic shelf label in the electronic shelf label group to send a beacon signal to position, according to the beacon signal, location information of a terminal device, and determining task execution information of the target task according to the location information.

Optionally, the task processing information comprises shelf label control information; and the positioning control module is configured for determining a positioning point on a task path according to the task processing information; and determining the positioning area according to the positioning point.

Optionally, the positioning control module is configured for selecting a plurality of electronic shelf labels in the positioning area to form the electronic shelf label group.

Optionally, the positioning control module is configured for determining a positioning time period corresponding to the positioning point; and controlling, within the positioning time period, the plurality of electronic shelf labels to send beacon signals.

Optionally, the positioning control module is configured for receiving a positioning completion indication corresponding to a target operation point; and sending a positioning activation indication to an electronic shelf label group in a positioning area corresponding to a next operation point, and controlling an electronic shelf label in the electronic shelf label group to send a beacon signal.

An embodiment of the present application further discloses a positioning apparatus applied to a terminal device, comprising: a receiving module, configured for receiving task processing information of a target task; a display module, configured for displaying the target task according to the task processing information; and a positioning module, configured for scanning, on condition that an operation point is reached, beacon signals of electronic shelf labels, and receiving signal data, the electronic shelf labels comprising a plurality of electronic shelf labels in an electronic shelf label group in a positioning area; and sending the signal data to determine, according to the signal data, location information and reporting the location information, and determining task execution information of the target task according to the location information.

Optionally, the task processing information comprises positioning execution information, and the display module is configured for displaying, according to the positioning execution information, an operation point, commodity information of a commodity object and operation content.

Optionally, the positioning module is further configured for determining location information of a terminal device according to positioning data; and sending the location information of the terminal device.

Optionally, the positioning module is further configured for sending a positioning completion indication after completing a corresponding task at the operation point.

Optionally, the display module is further configured for acquiring and displaying reminder information, wherein the reminder information comprises operation reminder information and/or warning information.

An embodiment of the present application further discloses a positioning apparatus applied to a positioning server, comprising: a signal receiving module, configured for receiving signal data of a terminal device, the signal data being acquired by the terminal device by scanning beacon signals of electronic shelf labels at an operation point, and the electronic shelf labels comprising a plurality of electronic shelf labels in an electronic shelf label group in a positioning area; and a positioning processing module, configured for performing positioning processing according to the signal data and location information of a corresponding electronic shelf label to determine location information of the terminal device; and sending the location information to determine task execution information of a target task according to the location information.

Compared to the prior art, the embodiments of the present application include the following advantages.

In the embodiments of the present application, the task management platform may drive, based on a task, positioning of the terminal device and electronic shelf labels, wherein the task processing information may be generated based on the task information of the target task. Then, the shelf label management platform controls, according to the task processing information, electronic shelf labels in a positioning area to transmit beacon signals, which can control that the beacon signals are sent only when the positioning is needed, without the need for all the electronic shelf labels to continuously send beacon signals, reducing the power consumption caused by the electronic shelf labels due to the positioning, and improving the service life of the electronic shelf labels. Accordingly, the terminal device may receive signal data of the beacon signals after reaching the positioning area, and determine location information based on this signal data, and the task management platform determines task execution information of the target task according to the location information. Accordingly, execution of the positioning is driven by the task, and the positioning may also provide feedback on the execution of the task, which can perform more accurate management of the execution of the task, and improve management efficiency.

DETAILED DESCRIPTION

In order to enable the above purposes, features and advantages of the present application to be more obvious and understandable, further detailed explanations of the present application will be provided below with reference to the drawings and specific implementations.

Embodiments of the present application may be applied to indoor positioning scenarios. Taking an indoor environment such as a department store or a supermarket as an example, assisted indoor positioning may be performed based on currently existing devices.

Taking a supermarket as an example, in a current retail store such as a supermarket, electronic shelf labels (ESLs) are often used to display the prices and other information of retail goods. The present application may make use of capabilities of existing ESL systems to reduce equipment investment and maintenance investment in building store positioning capabilities. Through ESLs, beacon signals are sent by broadcasting, such that the ESLs may be randomly selected to broadcast beacons without incurring any additional management burden on the ESLs. Afterwards, indoor positioning may be performed based on the beacon signals broadcasted by the ESLs, improving the precision of indoor positioning and reducing additional consumption. In an embodiment of the present application, ESLs or other similar electronic devices may be added with a beacon signal source function, and beacon signals may be broadcasted and sent in a wireless manner, such as through Bluetooth, Radio Frequency (RF), ZigBee, Wireless-Fidelity (WI-FI) and other wireless ways to achieve sending of the signals.

Electronic shelf labels include active shelf labels and passive shelf labels. The active shelf labels refer to electronic shelf labels with an external power source, while the passive shelf labels refer to electronic shelf labels that have no external power source and are powered by batteries. For the passive shelf labels, frequent transmission of beacon signals may increase the power consumption and reduce the service life of the electronic shelf labels. Similarly, for the active shelf labels, although power may be supplied by an external power source, frequent transmission of signals will still cause degradation of other parts and components. Therefore, embodiments of the present application provide a positioning mode, in which electronic shelf labels may be driven by a task to transmit beacon signals, that is, some electronic shelf labels are selected in an area that needs to be positioned to send beacon signals only when there is a task, such that a terminal device can perform positioning; while when there is no task, the electronic shelf labels do not need to send beacon signals, reducing the frequency and time of sending signals, extending the service life of the electronic shelf labels, and reducing degradation.

Figure 1:
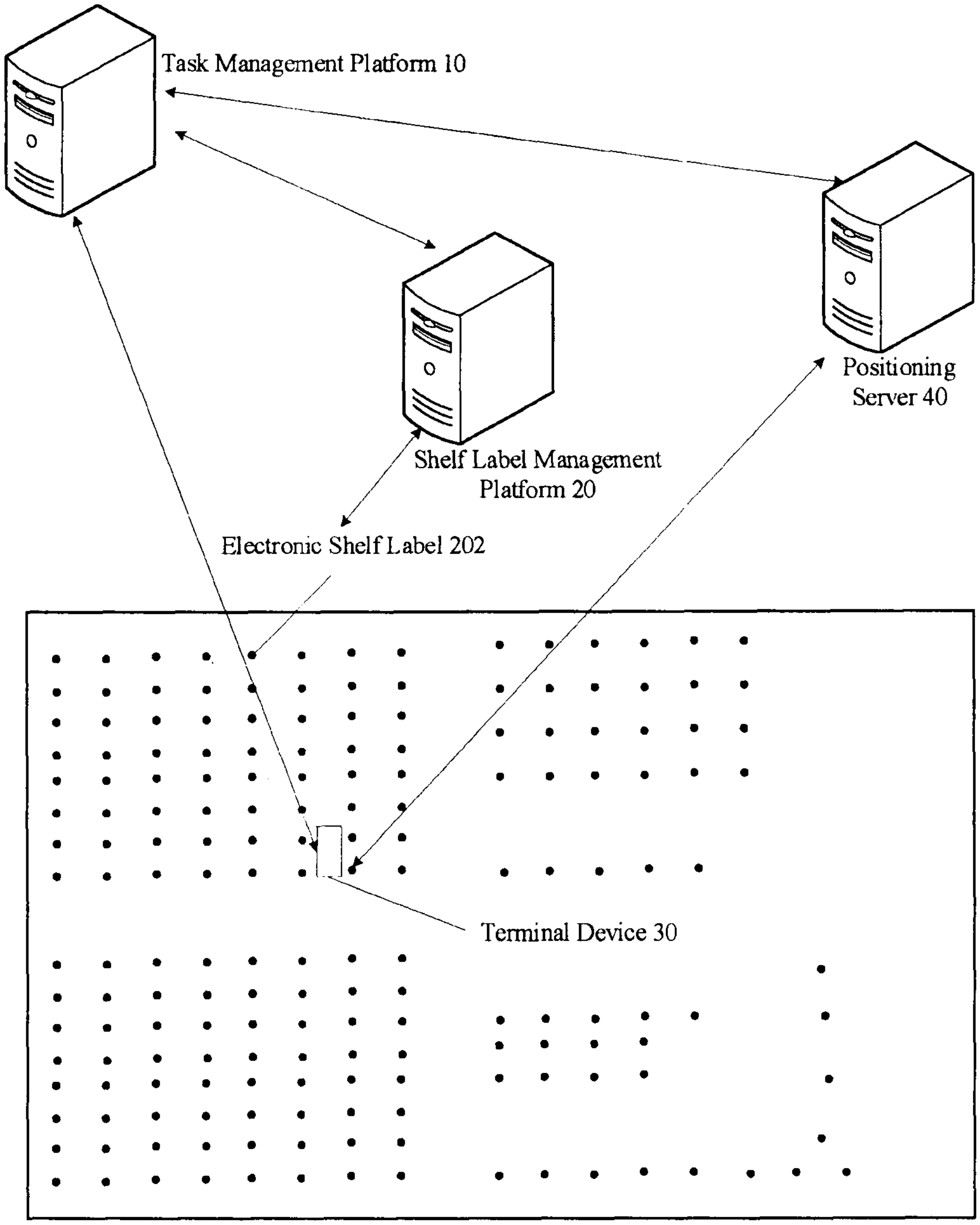
FIG. 1 is a schematic diagram of a positioning scenario of a positioning system in an embodiment of the present application.

Referring to FIG. 1, there is shown a schematic diagram of an indoor positioning scenario according to an embodiment of the present application.

A positioning system comprises: a task management platform 10, a shelf label management platform 20, a terminal device 30, electronic shelf labels 202, and a positioning server 40.

The task management platform is used for managing tasks, executing various management operations including generation, distribution, and detection of the tasks. Taking an indoor scenario as an example, a user such as a handler needs to perform various processes such as replenishing and tallying on commodity objects on shelves, all of which may generate corresponding tasks. The task management platform is used for distributing the tasks and managing the processing progress and completion status of the tasks, thereby achieving standardized management. The task management platform may drive the execution of positioning based on a task, such that an electronic shelf label activates a positioning function under certain conditions, such as sending a beacon signal at a designated time, in a designated area, or the like, and a corresponding user may execute positioning detection after reaching the designated area, while electronic shelf labels in non-designated areas do not need to activate the positioning function, thereby reducing positioning consumption.

The shelf label management platform is used for managing electronic shelf labels, including adjusting display information of the electronic shelf labels, and managing the positioning function of the electronic shelf labels. The management of the positioning function comprises activating and deactivating the positioning function. The shelf label management platform may manage the positioning function of the electronic shelf labels based on instructions from the task management platform, including activating and deactivating the positioning function.

In the indoor scenario, an electronic shelf label is deployed on a shelf, which may display commodity information of a commodity object on the shelf. This electronic shelf label is compatible with a beacon function, that is, a signal source function of beacon signal may be set for the ESL, and the ESL is used as one signal source to broadcast a beacon signal. Therefore, indoor positioning is performed based on beacon signals broadcasted by respective ESLs.

The terminal device may be a mobile phone, a handheld terminal, or other devices. A user may use a terminal device to receive a task and perform scanning for positioning etc. by the terminal device during execution of the task.

The positioning server is used for executing positioning, including executing various management operations such as positioning calculation for the terminal and recording of positioning information, etc.

On the basis of the above positioning system, a positioning method is provided that can drive, based on a task of the task management platform, the terminal device to perform positioning during execution of the task, and also may drive the shelf label management platform to control, based on the execution of the task, an electronic shelf label to control positioning in a corresponding area.

Figure 2:
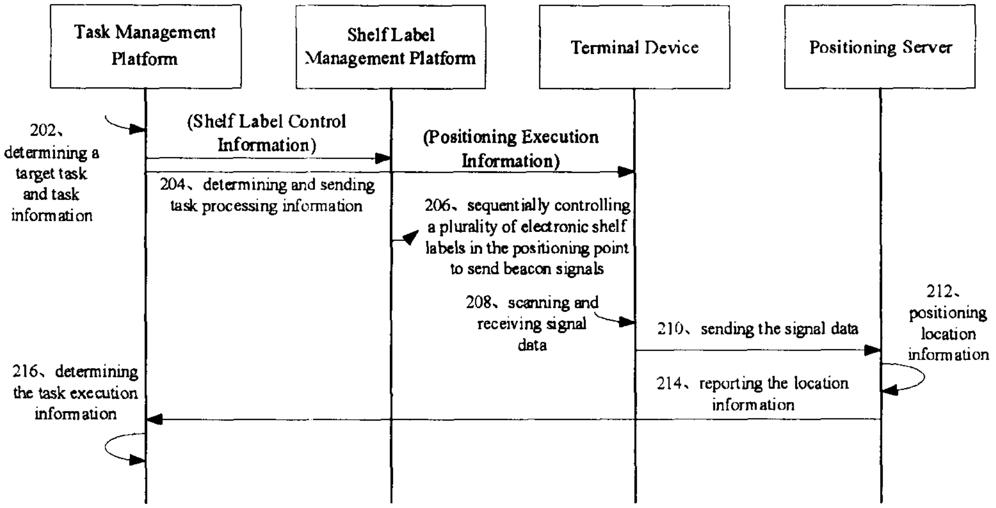
FIG. 2 is a schematic diagram of interaction in a positioning method embodiment in the present application.

Referring to FIG. 2, there is shown a schematic diagram of interaction in a positioning method embodiment of the present application.

At Step 202, determining, by a task management platform, a target task and task information of the target task.

The task management platform may generate corresponding tasks based on various demands, and the tasks may include various types, such as a replenishing task, a tallying task, a picking task, or the like, which may be specifically determined according to actual demands. Each target task may correspond to a plurality of commodity objects, and each commodity object is associated with commodity information and location information, wherein based on different tasks, the location information further involves various situations, and for a replenishing task, for example, the location information comprises location information of the commodity object in a warehouse and location information of the commodity object in a store. Based on the location information of the commodity object, a task path and task operation information may be planned for the target task. This task path is a path corresponding to the user's execution of the target task, and each point on the path corresponds to a location of at least one commodity object. The task operation information is operation information for a commodity object in a task, such as shelving commodity objects, cleaning up expired commodity objects, or the like. When planning a task path, the type of commodity objects may further be considered. The path is planned based on requirements such as a time limit corresponding to the type of the commodity objects. For example, in a replenishing task, time requirements for fresh and frozen products from a warehouse to placement positions at a shopping place are relatively strict, and therefore, when a path is to be planned, picking operations may be arranged later in order, and shelving operations may be arranged first in order, thereby minimizing the processing time of such commodity objects. Correspondingly, the task path may be planned based on the commodity information and location information of the commodity objects.

Determining the target task and the task information of the target task comprises: acquiring the target task; determining at least one commodity object corresponding to the target task, and generating the task information based on the at least one commodity object. The task management platform may be connected to the management server or serve as one component of the management server. The management server may determine a target task based on demands, such as determining lack of multiple kinds of products based on orders, or receiving orders that require sorting and packaging multiple kinds of products. Then the task management platform acquires this target task, wherein the task may correspond to a task rule, or the like, such that the task information of this target task may be determined based on the task rule. At least one commodity object may be determined based on the target task, which is a commodity object that needs to be processed in this task, then the commodity information of this commodity object may be acquired, and the task information is generated based on the commodity information and the task rule. The task rule is used for generating task information based on the task, which may comprise route planning, device planning, or the like for the task, such as designating a processing route corresponding to the task, assigning the task to a handler, etc.

In one optional embodiment, generating task information based on the commodity object comprises: acquiring commodity information and location information of each of the at least one commodity object; planning a task path for the target task according to the location information of each of the at least one commodity object, and determining corresponding operation information; and determining corresponding task information according to the commodity information, the location information of each of the at least one commodity object, the task path, and the operation information. For each commodity object, commodity information and location information of this commodity object may be acquired. In some other examples, the location information may also be stored as part of the commodity information. Then, the task path of the target task may be planned based on the location information of the commodity object and the task rule, and the corresponding operation information may be determined.

Each type of task may correspond to a task rule, and various rule information related to the task may be defined through the task rule. For example, a standard operating procedure (SOP) for the task, which specifies standard operating steps for the task and provides a uniform format for describing an output, may guide and standardize daily work. For example, processing time for different commodity objects may be defined in the SOP or task rule. Taking a replenishing task as an example, for frozen products, the time from taking them out of a frozen environment in a warehouse to arriving at a frozen environment in a shopping place may be required to be, for example, within 10-15 minutes, to avoid frozen products thawing and ensure the quality of the frozen products. Still, for example, for a picking task, picking and packaging modes may be specified for different products, such as separate packaging of raw and cooked commodities, packaging rules for different frozen products, etc. and a standard operation time may be specified for each kind of task correspondingly.

Therefore, based on the location information of the commodity object and rule information, a task path may be planned for the task, that is, a processing order of each commodity object is determined, and then the task path is determined based on the location information and processing order of the commodity objects. Moreover, corresponding operation information may be determined based on the task rule, and this operation information may be determined based on the standard operating procedure (SOP), such as partitioned placement of different types of commodity objects.

Therefore, the task information may comprise: a task name, a task identifier, a processing user, at least one commodity object corresponding to the task, commodity information and location information of each commodity object, a task path, and operation information, etc.

At Step 204, generating task processing information based on the task information of the target task, and sending the task processing information.

After generating the target task and its task information, the task management platform may distribute the target task to a terminal device of a handler, and notify the shelf label management platform to execute positioning processing. Task processing information may be generated according to the task information of the target task, the task processing information comprising: positioning execution information and shelf label control information, wherein the positioning execution information is processing information about designating a task for the terminal device to control positioning, and the shelf label control information is information about the shelf label management platform controlling a shelf label to execute positioning.

Based on the task information of the target task, positioning execution information may be generated, wherein the positioning execution information may be generated based on the commodity information, the location information of the commodity object, the planned task path, and operation information, wherein operation points may be marked on the task path based on location information of commodity objects, and each operation point may correspond to operation time, operation content, or the like based on the operation information, so as to designate an operation logic of operating the task based on this task path, such that the target task may be designated based on this positioning execution information, and positioning of the device may be controlled. Therefore, the operation points on the task path may be determined based on the location information of the commodity objects, operation time and operation content corresponding to each operation point may be determined, and the positioning execution information may be determined based on the operation points on the task path, the operation time and the operation content corresponding to the operation points.

The shelf label control information may be generated according to the task information of the target task, wherein operation points may be marked on the task path based on the location information of the commodity object, and operation points that may be merged are determined considering positioning precision of the electronic shelf label. Location information of some commodity objects is overlapping, for example, for commodity objects in different layers of the same shelf, only one operation point may be marked for them; while location information of some commodity objects is within a designated range that is a positioning area of a positioning point, and the size of the positioning area may be determined according to the positioning precision. When several operation points may be covered by one positioning area, the operation points within this positioning area may be merged into one positioning point, thereby determining the positioning point on the task path. Moreover, start time and end time corresponding to this positioning point may be determined based on the operation time, so as to obtain a positioning time period of the positioning point. Therefore, the shelf label control information may be determined based on the positioning point on the task path, and the positioning time period. That is, based on the location information of the commodity object, the operation points are marked on the task path, the positioning point is determined according to the operation points, the positioning time period corresponding to the positioning point is determined, and the shelf label control information is generated according to the positioning point on the task path, and the positioning time period. In some other embodiments, a corresponding positioning point on the task path may also be determined according to the location information of the commodity object; a positioning time period corresponding to the positioning point is determined according to the operation information; and the shelf label control information is generated according to the positioning point on the task path, and the positioning time period, wherein when a plurality of operation points and location information of a plurality of commodity objects are within one positioning area, the operation points are merged.

Then, the positioning execution information may be sent to the terminal device of a designated operator, and the shelf label control information may be sent to the shelf label management platform.

At Step 206, controlling, by a shelf label management platform, a plurality of electronic shelf labels corresponding to the positioning point according to the shelf label control information to send beacon signals within the positioning time period.

After receiving the shelf label control information, the shelf label management platform may determine each positioning point on the task path, and determine, based on the positioning point, a plurality of corresponding electronic shelf labels to execute the positioning, then determine a positioning time period corresponding to each positioning point, instruct to send a beacon signal at the positioning point within the positioning time period, and activate the positioning function in a positioning area corresponding to this positioning point.

At Step 208, scanning, by a terminal device, in the positioning area corresponding to the positioning point, and receiving signal data of the beacon signals.

At Step 210, sending, by the terminal device, the signal data of the beacon signals to a positioning server.

After receiving the positioning execution information through the terminal device, the operator may execute the target task based on the positioning execution information, wherein he/she may check a commodity object that needs to be acquired and its location information, and may further determine corresponding operation norms and other operation information to execute the task along the task path. On condition that an operation point is reached, the positioning function of the terminal device may be activated, thereby scanning beacon information in the positioning area and receiving signal data of the beacon signals. Then, the signal data of the beacon signals is sent to the positioning server.

At Step 212, performing, by the positioning server, positioning according to the signal data to determine location information of the terminal device.

After receiving the signal data fed back from the terminal device, the positioning server may execute positioning according to this signal data, to determine location information of the terminal device.

At Step 214, sending, by the positioning server, the location information to the task management platform.

Then, the positioning server may directly send the location information of the terminal device to the task management platform, or provide feedback on the location information to each terminal device, and then the location information is reported by the terminal device to the task management platform.

At Step 216, determining, by the task management platform, task execution information of the target task according to the location information.

After acquiring the location information of the terminal device, the task management platform may determine a corresponding operation point on the task path based on this location information, thereby determining a commodity object corresponding to this operation point and then determining task progress information. Time information corresponding to the location information may also be recorded, thereby determining staying time of the operator at each operation point and each positioning point, and the staying time may also be recorded in the task execution information.

In some other embodiments, if the operator stays at one operation point or positioning point for too long, for example, the staying time exceeds a staying threshold, warning information may be sent to the terminal device, thereby displaying warning time on the terminal device to remind the operator that the operation takes too long, and the corresponding operator may also report a reason for the staying. Additionally, based on time information and operation information of a task, other reminder information may also be detected, such as an approaching time node for some time-limited operations, and the reminder information may be sent to the terminal device, reminding that time for certain tasks is approaching and prompt processing is required or the like.

In summary, the task management platform may drive, based on a task, positioning of terminal devices and electronic shelf labels, wherein the task processing information may be generated based on the task information of the target task. Then, the shelf label management platform controls, according to the task processing information, electronic shelf labels in a positioning area to transmit beacon signals, which can control that the beacon signals are sent only when the positioning is needed, without the need for all the electronic shelf labels to continuously send beacon signals, reducing the power consumption caused by the electronic shelf labels due to the positioning, and improving the service life of the electronic shelf labels. Accordingly, the terminal device may receive signal data of the beacon signals after reaching the positioning area, and determine location information based on this signal data, and the task management platform determines task execution information of the target task according to the location information. Accordingly, execution of the positioning is driven by the task, and the positioning may also provide feedback on the execution of the task, which can perform more accurate management of the execution of the task, and improve management efficiency.

Figure 3:
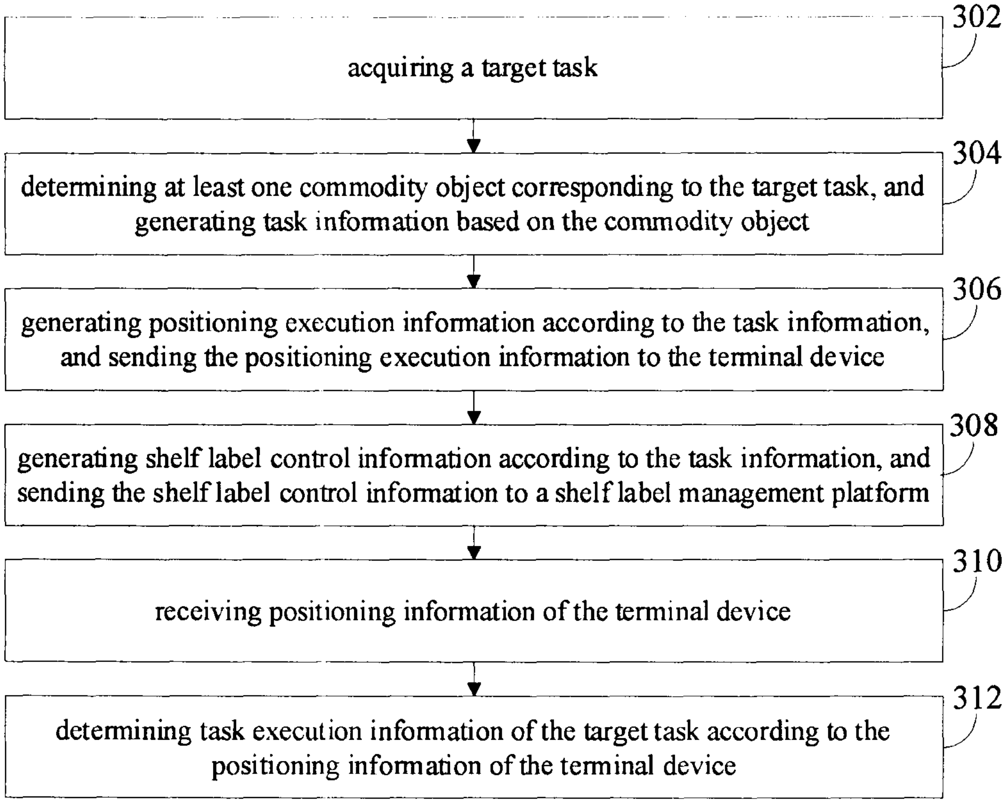
FIG. 3 is a flow chart of steps of a positioning method on a task management platform side in an embodiment of the present application.

On the basis of the above embodiments, an embodiment of the present application further provides positioning processing executed on a task management platform side, as shown in FIG. 3:

At Step 302, acquiring a target task.

At Step 304, determining at least one commodity object corresponding to the target task, and generating task information based on the at least one commodity object.

The task management platform may generate a target task based on various demands, and then determine at least one commodity object corresponding to the target task, acquire commodity information corresponding to the commodity object, and then generate task information of this target task in combination with operation procedures corresponding to the task, etc.

Generating task information based on the commodity object comprises: acquiring commodity information and location information of each of the least one commodity object; planning a task path for the target task according to the location information of each of the at least one commodity object, and determining corresponding operation information; and determining corresponding task information according to the commodity information, the location information of each of the at least one commodity object, the task path, and the operation information.

Taking the target task as a replenishing task as an example, a commodity object that needs to be replenished may be determined, and object information and location information of the commodity object may be acquired, wherein the location information of the commodity object in the replenishing task comprises a first location information in a warehouse and a second location information in a shopping place. Therefore, there are two nodes corresponding to one commodity object on a task path. After determining the location information of each commodity object, each location information may be treated as one node to establish a path. When establishing the path, respective nodes may be connected with reference to a task rule to form a task path, such as forming the shortest path for executing the target task, or generating, in combination with a type feature of the object, a task path for picking up later and replenishing first for frozen and fresh commodity objects, thereby shortening the operation time for the commodity object during the execution of the target task and ensuring the quality of the commodity object. For each node on the task path, operation information may further be configured, such as picking and placing information, packaging information, and other operation information of the commodity object. Then, corresponding task information is determined according to the operation information, the task path, the commodity information, and the location information of the commodity object.

At Step 306, generating positioning execution information according to the task information, and sending the positioning execution information to a terminal device.

After generating the task information, the task management platform may plan task processing and positioning processing executed by a terminal device, and a shelf label management platform controls electronic shelf labels to control transmission of positioning signals.

Positioning execution information of the terminal device may be designated based on this task information, and then the target task may be assigned to a corresponding handler and sent to the corresponding terminal device. A corresponding operation point may be determined on the task path according to the location information of the commodity object; operation time and operation content corresponding to the operation point are determined according to the operation information; and positioning execution information is generated according to the operation point on the task path, the operation time, and the operation content. The location information of the commodity object may be corresponded to a node on the task path to generate a corresponding operation point, wherein nodes at the same node or two nodes with a distance not exceeding a distance threshold, such as 0.5 meters or 1 meter, may be merged into the same operation point, then corresponding operation content may be determined based on the object information of the commodity object corresponding to each operation point, such as quantity, type, etc., and operation time corresponding to this operation point is calculated. This operation time may be determined by considering the location, quantity, and operation content of the commodity object. For example, the corresponding operation time is calculated based on the quantity, placing requirements, packaging requirements, etc. of the commodity object. Then, the positioning execution information is determined based on the operation time, and the operation content corresponding to the operation point, wherein the operation order for the commodity object may be determined when planning the path, such that the operation order may be determined based on the operation points on the path.

At Step 308, generating shelf label control information according to the task information, and sending the shelf label control information to a shelf label management platform.

Based on this task information, a shelf label management platform may also be instructed to control electronic shelf labels, corresponding shelf label control information is generated and sent to the shelf label management platform, such that the electronic shelf labels may be controlled to activate positioning in sequence following an execution path, such as transmitting beacon signals when an operator is about to reach and reaches a positioning area, and stopping transmission after leaving.

In one optional embodiment, a corresponding positioning point is determined on the task path according to the location information of the commodity object; a positioning time period corresponding to the positioning point is determined according to the operation information; and the shelf label control information is generated according to the positioning point on the task path, and the positioning time period. Based on the location information of the commodity object, a positioning point may be determined on the task path, wherein when distances among a plurality of positioning points are within a designated range, they may be merged into one positioning point, that is, several positions relatively close in distance may be taken as the same positioning point. Then, information such as time when the handler performs corresponding operation at this positioning point may also be determined, thereby obtaining a positioning time period corresponding to this positioning point, and shelf label control information is generated according to the positioning point on the task path, and the positioning time period.

In another optional embodiment, when the positioning execution information has been determined, shelf label control information may also be determined based on the positioning execution information. A positioning point on the task path may be determined according to an operation point on the task path; a positioning time period corresponding to the positioning point may be determined according to the operation time corresponding to the operation point; and shelf label control information may be generated according to the positioning point on the task path, and the positioning time period. The step of determining a positioning point on the task path comprises: on condition that a plurality of operation points or location information of a plurality of commodity objects are in one positioning area, merging the plurality of operation points.

After determining positioning time periods corresponding to respective positioning points, the shelf label management platform may subsequently control a plurality of electronic shelf labels corresponding to the positioning points to perform positioning in sequence based on the positioning time periods, thereby eliminating the need for each electronic shelf label to send beacon signals in real time, which can reduce the power consumption of the electronic shelf labels, and improve the service life of the electronic shelf labels.

At Step 310, receiving positioning information of the terminal device.

At Step 312, determining task execution information of the target task according to the positioning information of the terminal device.

After receiving the positioning execution information, the terminal device of the handler may execute the target task based on this positioning execution information, such that during the process of reaching the operation point to execute operation, the terminal device may detect the beacon signals of the electronic shelf labels corresponding to the operation point, determine location information, and then report the location information to the task management platform.

After acquiring the location information of the terminal device, the task management platform may determine the corresponding operation point on the task path based on this location information, thereby determining the commodity object corresponding to this operation point and then determining task progress information. Time information corresponding to the location information may also be recorded, thereby determining staying time of the operator at each operation point and each positioning point, and the staying time may also be recorded in the task execution information.

In some other embodiments, if the operator stays at one operation point or positioning point for too long, for example, the staying time exceeds a staying threshold, warning information may be sent to the terminal device, thereby displaying warning time on the terminal device to remind the operator that the operation takes too long, and the corresponding operator may also report a reason for the staying. Additionally, based on time information and operation information of a task, other reminder information may also be detected, such as an approaching time node for some time-limited operations, and the reminder information may be sent to the terminal device, reminding that time for certain tasks is approaching and prompt processing is required.

Figure 4:
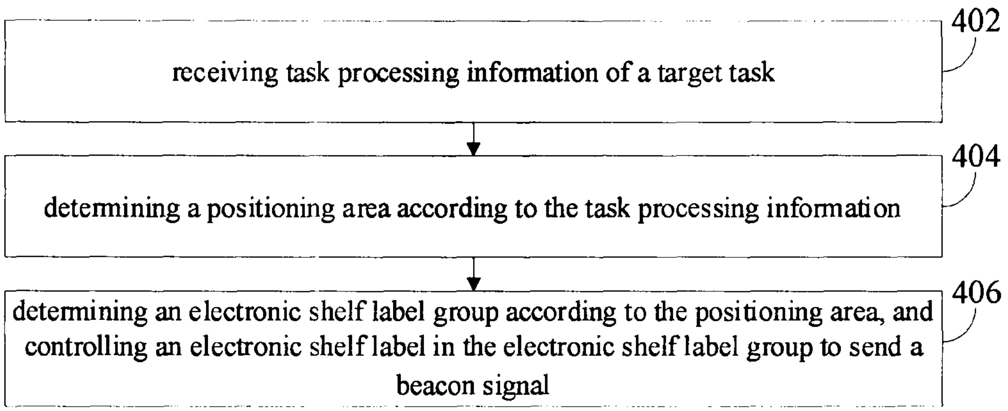
FIG. 4 is a flow chart of steps of a positioning method on a shelf label management platform side in an embodiment of the present application.

On the basis of the above embodiments, an embodiment of the present application further provides positioning processing executed on a shelf label management platform side, as shown in FIG. 4:

At Step 402, receiving task processing information of a target task. The task processing information comprises shelf label control information.

At Step 404, determining a positioning area according to the task processing information.

At least one positioning point is determined from the shelf label control information, and a positioning area is determined according to the positioning point. Determining a positioning area according to the task processing information comprises: determining a positioning point on the task path according to the task processing information; and determining the positioning area according to the positioning point. Shelf label control information sent by a task management platform may be received, a positioning point that needs to be positioned in the target task may be determined according to the shelf label control information, and then a corresponding positioning area may be determined based on this positioning point.

Deploying electronic shelf labels (ESL) compatible with a beacon function in an indoor environment such as a store, location information and shelf label identifiers of respective ESLs may be determined. This location information may be represented in various forms such as longitude and latitude information, coordinate information, etc. Taking a supermarket as an example, commodity information is displayed on shelves through the ESLs, wherein the commodities on the shelves of the supermarket are usually placed according to regulations, and commodity information may be displayed through ESLs correspondingly. Therefore, location information of each electronic shelf label as deployed may be determined, and the location information of each electronic shelf label may be recorded in a target list, wherein the shelf label identifier is a unique identifier of an electronic shelf label for uniquely determining one electronic shelf label, which may be a unique string assigned to the electronic shelf label, or may be a media access control (MAC) address of the electronic shelf label, or the like.

In some scenarios, electronic shelf labels are used to show commodity information of commodity objects. Therefore, corresponding information may usually be recorded in the target list based on a commodity object by, for example, using the minimum stock keeping unit (SKU) of the commodity object as a commodity identifier, or using other commodity identifiers. Moreover, commodity information corresponding to this commodity, such as name, is recorded in the target list, or may also be based on a device identifier and location information of the electronic shelf label that displays the commodity information. The mode of recording the electronic shelf labels in the target list is not limited in the embodiments of the present application and may be determined based on practical applications, wherein the target list at least comprises the device identifier and location information of each electronic shelf label.

At Step 406, determining an electronic shelf label group according to the positioning area, controlling an electronic shelf label in the electronic shelf label group to send a beacon signal to position, according to the beacon signal, location information of a terminal device, and determining task execution information of a target task according to the location information.

A plurality of electronic shelf labels may be selected in the positioning area to form an electronic shelf label group. Then, a positioning time period corresponding to the positioning point is determined; and within the positioning time period, the plurality of electronic shelf labels in the electronic shelf label group are controlled to send beacon signals.

Therefore, a shelf label management platform may control, based on shelf label control information, electronic shelf labels to activate a positioning function in sequence within the positioning time period according to positioning points on the task path, and transmit the required beacon signals for positioning.

In some other scenarios, controlling electronic shelf labels in the electronic shelf label group to send beacon signals comprises: receiving a positioning completion indication corresponding to a target operation point; sending a positioning activation indication to an electronic shelf label group in a positioning area corresponding to a next operation point, and controlling electronic shelf labels in the electronic shelf label group to send beacon signals. Sometimes, after completing operations at a current operation point (i.e., the target operation point), the handler will proceed to a next operation point according to this task path to execute corresponding task processing, and feedback on a positioning completion indication corresponding to the target operation point may be provided by the terminal device or task management platform; then, the shelf label management platform sends a positioning activation indication to an electronic shelf label group in a positioning area corresponding to the next operation point, to activate positioning in the next positioning area.

In one optional embodiment, during the process of electronic shelf labels being designated for positioning according to positioning points corresponding to a task path, when an electronic shelf label is selected at a current positioning point to transmit a signal, the positioning function of a selected electronic shelf label in a previous positioning point may further be deactivated to stop transmitting a beacon signal.

This ensures that both the electronic shelf labels and the terminal device are ready before the handler reaches an operation point on the path, and the positioning function of the terminal device and a selected electronic shelf label may also be activated appropriately in advance according to a positioning time period, an operation event, and a real-time indicator for electronic shelf label controlled communication, etc.

Therefore, a reasonable number of electronic shelf labels may be selected by the shelf label control platform to transmit beacon signals. By scanning an appropriate amount of beacon information, excessive electromagnetic interference on site caused by a too large amount of beacon information can be avoided, and inaccurate positioning caused by a too small amount of beacon information can also be avoided.

Moreover, with the activation or deactivation of a positioning function corresponding to an electronic shelf label in a controlled positioning area as designated by a task, a mode of low-power close-range signal broadcasting can be employed to reduce channel occupation.

Figure 5:
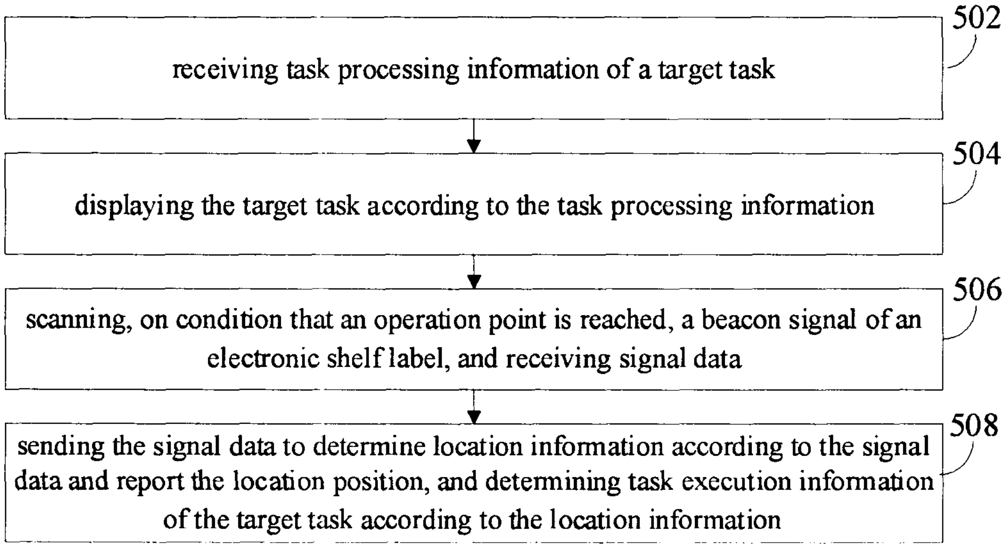
FIG. 5 is a flow chart of steps of a positioning method on a terminal device side in an embodiment of the present application.

On the basis of the above embodiments, an embodiment of the present application further provides positioning process executed on a terminal device side, as shown in FIG. 5.

A terminal device may be various terminal devices, such as a handheld device (digital assistant (DA)), a tablet computer, a mobile phone, or the like, which may be selected based on demands and applications. DA is a handheld electronic device with display and input components used by employees in industries such as retail, pharmaceuticals, and logistics, when executing operations on corresponding objects, such as shelving, sorting, replenishing, packaging, and relocating, which is configured with a memory, a CPU, a screen, and a button or a keyboard, has abilities to transmit and process data wirelessly, and may be movable for use as equipped with its own battery.

At Step 502, receiving task processing information of a target task. The task processing information comprises positioning execution information.

At Step 504, displaying the target task according to the task processing information, wherein an operation point and commodity object information of a commodity object corresponding thereto may be displayed according to the positioning execution information.

An operator may automatically receive task processing information of a target task, or acquire a target task by means of preemption and then receive the task processing information. Various information of the target task may be displayed on a terminal device, such as displaying an operation point and commodity object information of a commodity object corresponding thereto, operation content, or the like.

At Step 506, scanning, on condition that an operation point is reached, beacon signals of electronic shelf labels, and receiving signal data, the electronic shelf labels comprising a plurality of electronic shelf labels in an electronic shelf label group in a positioning area.

At Step 508, sending the signal data to determine, according to the signal data, location information and reporting the location information, and determining task execution information of the target task according to the location information.

If necessary, the terminal device may activate a scanning function to scan beacon signals broadcasted by electronic shelf labels, such that signal data of a plurality of beacon signals may be received within unit time. The signal data comprises a shelf label identifier and positioning associated information. The shelf label identifier may be a unique identifier of an electronic shelf label, such as a MAC address. The positioning associated information may be information related to positioning, such as signal strength, signal fingerprint, or the like, which, for example, may be a Bluetooth fingerprint in the case of Bluetooth positioning, or may be a WI-FI fingerprint in the case of WI-FI positioning. The signal strength may be acquired when a beacon signal is scanned.

The terminal device of the operator may activate the positioning function before reaching an operation point, thereby scanning, when reaching the positioning point, beacon signals of electronic shelf labels, receiving signal data, and then sending the signal data to a positioning server. In some other scenarios, an engine for positioning calculation may also be disposed in the terminal device, such that the terminal device calculates the signal data based on this positioning engine, and determines location information. According to the positioning data, location information of the terminal device is determined; and the location information of the terminal device is sent.

In the embodiments of the present application, the terminal device may also send a positioning completion indication after completing a corresponding task at an operation point. For example, after a task is operated to complete operation at one operation point, a corresponding control on the terminal device may be clicked on to indicate completion of the operation, thereby generating a positioning completion indication to send the same to a task management platform. The task management platform may determine an operation processing time for the task based on time information corresponding to this positioning completion indication, or may also send the positioning completion indication to a shelf label management platform, thereby facilitating control of positioning of a next positioning point by the shelf label management platform.

In the embodiments of the present application, the task management platform may generate reminder information, such as operation reminder information, warning information, or the like, and then send the same to the terminal device. The terminal device may acquire and display reminder information, the reminder information comprising operation reminder information and/or warning information. In some other scenarios, the terminal device may also determine itself whether it is necessary to generate operation reminder information based on operation time and corresponding staying time at an operation point. Based on the reminder information, the operator may also provide feedback on operation issues etc. through the terminal device, such that any issues that arise can be reported quickly.

Moreover, the terminal device performs scanning for positioning when needed, which can reduce the power consumption of the device and ensure the normal execution of a task.

Figure 6:
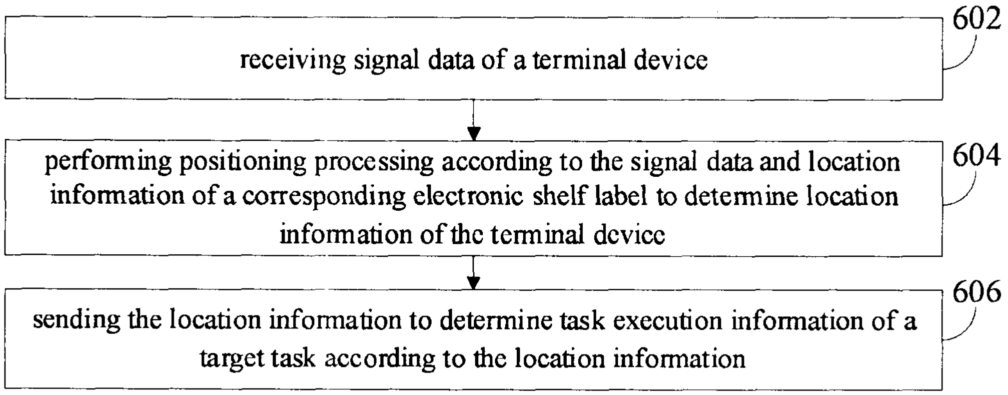
FIG. 6 is a flow chart of steps of a positioning method at a positioning server in an embodiment of the present application.

On the basis of the above embodiments, an embodiment of the present application further provides positioning processing executed at a positioning server, as shown in FIG. 6:

At Step 602, receiving signal data of a terminal device, the signal data being acquired by the terminal device by scanning beacon signals of electronic shelf labels at an operation point, and the electronic shelf labels comprising a plurality of electronic shelf labels in an electronic shelf label group in a positioning area.

At Step 604, performing positioning processing according to the signal data and location information of a corresponding electronic shelf label to determine location information of the terminal device.

At Step 606, sending the location information to determine task execution information of a target task according to the location information.

After acquiring signal data of a plurality of beacon signals, the positioning server may acquire shelf label identifiers and positioning associated information, and then query a target list according to each shelf label identifier, wherein a commodity object corresponding to the shelf label identifier may be queried in the target list, and then location information of the commodity object may be queried. Generally, in an environment such as a supermarket, commodity objects may be exhibited according to certain rules, and a target list will also be generated correspondingly to record commodity information, location, and shelf label information of associated electronic shelf labels of the commodity objects. Therefore, the shelf label identifier of an electronic shelf label may also correspond to a corresponding commodity object, and then the location of the electronic shelf label may be determined based on the location of the commodity object. Moreover, during this process, the electronic shelf labels may also be filtered and screened based on multiple pieces of location information. If a location(s) corresponding to an electronic shelf label(s) is relatively far from locations corresponding to other electronic shelf labels, this electronic shelf label may be considered as noisy data and ignored to ensure the accuracy of the data.

After acquiring location information of an electronic shelf label corresponding to each beacon signal, location information of the terminal device may be determined based on this location information and positioning associated information.

When the positioning associated information is signal strength of the beacon signal, location information of the terminal device may be determined based on the signal strength of the beacon signal and the location information. For example, based on a triangulation positioning method, the position and distance of a target may be determined using principles of triangular geometry. A distance from a corresponding electronic shelf label may be determined based on the signal strength of the beacon signal, and a center location may be determined based on at least 3 electronic shelf labels, which serves as the location information of the terminal device.

In some other scenarios, the positioning associated information may be wireless fingerprint data, such as Bluetooth fingerprint data, WI-FI fingerprint data, or the like. The wireless fingerprint data may be understood as a piece of location fingerprint, which means linkage between a location in an actual environment and a certain "fingerprint", such that one location corresponds to one unique fingerprint. Fingerprint database for various locations may be collected and established in advance based on corresponding wireless modes. Therefore, fingerprint information of a beacon signal corresponding to an electronic shelf label may be measured, the fingerprint information may be matched with corresponding wireless fingerprint data in a fingerprint database, and matched location information may be determined and serve as the location information of the terminal device.

Only two examples of positioning have been described above, and in actual processing, positioning may be performed according to demands. If positioning is directly performed within the terminal device, the same mode as the above may be employed for positioning, and thus will not be repeated here.

In summary, actual spatial location information of an ESL is acquired by searching a target list and location information of a commodity object corresponding to the ESL in a database, which is used for positioning calculation of a positioning engine. This ensures the availability of broadcasted beacon signals.

Moreover, the embodiments of the present application can make use of capabilities of an existing ESL system in an indoor environment, such as a supermarket, to reduce equipment investment and maintenance investment in building store positioning capabilities. ESLs in a positioning area are selected randomly to broadcast beacon signals, without incurring any additional management burden on the ESLs. By calculating a broadcast frequency required by beacon signals that meet a condition for positioning precision, beacon signals broadcasted by a plurality of ESLs in the positioning area are selected randomly to minimize reduction in service life.

Moreover, with the activation or deactivation of a positioning function corresponding to an electronic shelf label in a controlled positioning area as designated by a task, a mode of low-power close-range signal broadcasting can be employed to reduce channel occupation.

It should be noted that for the purpose of brief description, the method embodiments are all expressed as a combination of a series of actions. However, those skilled in the art should be aware that the embodiments of the present application are not limited by the described order of actions, because according to the embodiments of the present application, certain steps may be performed in other orders or simultaneously. Secondly, those skilled in the art should also be aware that the embodiments described in the specification are all preferred embodiments, and the actions involved are not definitely necessary for the embodiments of the present application.

An embodiment of the present application provides a positioning system, comprising: a task management platform, a shelf label management platform, a terminal device, electronic shelf labels, and a positioning server; wherein:

the task management platform determines a target task and task information of the target task; generates task processing information according to the task information, sends the task processing information to the shelf label management platform and the terminal device; and determines task execution information of the target task according to location information;

the shelf label management platform controls, according to the task processing information, an electronic shelf label in a positioning area to transmit a beacon signal;

the terminal device receives signal data of the beacon signal in the positioning area; and sends the signal data of the beacon signal to the positioning server; and the positioning server performs positioning according to the signal data, determines location information of the terminal device; and send the location information to the task management platform.

In summary, the task management platform may drive, based on a task, positioning of the terminal device and electronic shelf labels, wherein the task processing information may be generated based on the task information of the target task. Then, the shelf label management platform controls, according to the task processing information, an electronic shelf label in a positioning area to transmit a beacon signal, which can control that a beacon signal is sent only when the positioning is needed, without the need for all the electronic shelf labels to continuously send beacon signals, reducing the power consumption caused by the electronic shelf labels due to the positioning, and improving the service life of the electronic shelf labels. Accordingly, the terminal device may receive signal data of the beacon signal after reaching the positioning area, and determine location information based on this signal data, and the task management platform determines task execution information of the target task according to the location information. Accordingly, execution of the positioning is driven by the task, and the positioning may also provide feedback on the execution of the task, which can perform more accurate management of the execution of the task, and improve management efficiency.

On the basis of the above embodiments, a positioning apparatus applied to a task management platform is further provided, comprising:

a task determination module, configured for determining a target task and task information of the target task;

a task distribution module, configured for generating task processing information according to the task information, and sending the task processing information;

a location receiving module, configured for receiving location information of a terminal device, the location information being determined by the terminal device by scanning a beacon signal of an electronic shelf label in a positioning area, and the positioning area being determined according to the task processing information; and a task result module, configured for determining task execution information of the target task according to the location information.

Optionally, the task determination module is configured for acquiring the target task; determining at least one commodity object corresponding to the target task, and generating the task information based on the at least one commodity object.

Optionally, the task determination module is configured for acquiring commodity information and location information of each of the at least one commodity object; planning a task path for the target task according to the location information of each of the at least one commodity object, and determining corresponding operation information; and determining corresponding task information according to the commodity information, the location information of each of the at least one commodity object, the task path, and the operation information.

Optionally, the task distribution module is configured for generating positioning execution information according to the task information, sending the positioning execution information to the terminal device; generating shelf label control information according to the task information, sending the shelf label control information to a shelf label management platform; and sending the task information to the shelf label management platform and the terminal device.

Optionally, the task distribution module is configured for determining a corresponding operation point on a task path according to location information of a commodity object; determining operation time and operation content corresponding to the operation point according to operation information; and generating the positioning execution information according to the operation point on the task path, the operation time, and the operation content.

Optionally, the task distribution module is configured for determining a positioning point on a task path according to an operation point on the task path; determining a positioning time period corresponding to the positioning point, according to operation time corresponding to the operation point; and generating, according to the positioning point on the task path and the positioning time period, the shelf label control information.

Optionally, the task distribution module is configured for determining a corresponding positioning point on a task path according to location information of a commodity object; determining a positioning time period corresponding to the positioning point according to operation information; and generating, according to the positioning point on the task path and the positioning time period, the shelf label control information.

Optionally, the task distribution module is configured for merging a plurality of operation points on condition that the plurality of operation points or location information of a plurality of commodity objects are in one positioning area.

Optionally, the task result module is further configured for determining time information corresponding to the location information; determining staying time of the terminal device in a corresponding positioning area according to the time information; and recording the staying time.

Optional, the task result module is further configured for generating warning information on condition that it is detected that staying time of the terminal device in the positioning area exceeds a staying threshold.

An embodiment of the present application further discloses a positioning apparatus applied to a shelf label management platform, comprising:

- a task receiving module, configured for receiving task processing information of a target task; and
- a positioning control module, configured for determining a positioning area according to the task processing information; and determining an electronic shelf label group according to the positioning area, controlling an electronic shelf label in the electronic shelf label group to send a beacon signal to position, according to the beacon signal, location information of a terminal device, and determining task execution information of the target task according to the location information.

Optionally, the task processing information comprises shelf label control information; and the positioning control module is configured for determining a positioning point on a task path according to the task processing information; and determining the positioning area according to the positioning point.

Optionally, the positioning control module is configured for selecting a plurality of electronic shelf labels in the positioning area to form the electronic shelf label group.

Optionally, the positioning control module is configured for determining a positioning time period corresponding to the positioning point; and controlling, within the positioning time period, the plurality of electronic shelf labels to send beacon signals.

Optionally, the positioning control module is configured for receiving a positioning completion indication corresponding to a target operation point; and sending a positioning activation indication to an electronic shelf label group in a positioning area corresponding to a next operation point, and controlling an electronic shelf label in the electronic shelf label group to send a beacon signal.

Therefore, a reasonable number of electronic shelf labels may be selected by the shelf label control platform to transmit beacon signals. By scanning an appropriate amount of beacon information, excessive electromagnetic interference on site caused by a too large amount of beacon information can be avoided, and inaccurate positioning caused by a too small amount of beacon information can also be avoided.

Moreover, with the activation or deactivation of a positioning function corresponding to an electronic shelf label in a controlled positioning area as designated by a task, a mode of low-power close-range signal broadcasting can be employed to reduce channel occupation.

An embodiment of the present application further discloses a positioning apparatus applied to a terminal device, comprising:

- a receiving module, configured for receiving task processing information of a target task;
- a display module, configured for displaying the target task according to the task processing information; and
- a positioning module, configured for scanning, on condition that an operation point is reached, beacon signals of electronic shelf labels, and receiving signal data, the electronic shelf labels comprising a plurality of electronic shelf labels in an electronic shelf label group in a positioning area; and sending the signal data to determine, according to the signal data, location information and reporting the location information, and determining task execution information of the target task according to the location information.

Optionally, the task processing information comprises positioning execution information, and the display module is configured for displaying, according to the positioning execution information, an operation point, commodity information of a commodity object and operation content.

Optionally, the positioning module is further configured for determining location information of the terminal device according to positioning data; and sending the location information of the terminal device.

Optionally, the positioning module is further configured for sending a positioning completion indication after completing a corresponding task at the operation point.

Optionally, the display module is further configured for acquiring and displaying reminder information, wherein the reminder information comprises operation reminder information and/or warning information.

Moreover, the terminal device performs scanning for positioning when needed, which can reduce the power consumption of the device and ensure the normal execution of a task.

An embodiment of the present application further discloses a positioning apparatus applied to a positioning server, comprising:

- a signal receiving module, configured for receiving signal data of a terminal device, the signal data being acquired by the terminal device by scanning beacon signals of electronic shelf labels at an operation point, and the electronic shelf labels comprising a plurality of electronic shelf labels in an electronic shelf label group in a positioning area; and a positioning processing module, configured for performing positioning processing according to the signal data and location information of a corresponding electronic shelf label to determine location information of the terminal device; and sending the location information to determine task execution information of a target task according to the location information.

In summary, actual spatial location information of an ESL is acquired by searching a target list and location information of a commodity object corresponding to the ESL in a database, which is used for positioning calculation of a positioning engine. This ensures the availability of broadcast beacon signals.

Moreover, the embodiments of the present application can make use of capabilities of an existing ESL system in an indoor environment, such as a supermarket, to reduce equipment investment and maintenance investment in building store positioning capabilities. ESLs in a positioning area are selected randomly to broadcast beacon signals, without incurring any additional management burden on the ESLs. By calculating a broadcast frequency required by beacon signals that meet a condition for positioning precision, beacon signals broadcasted by a plurality of ESLs in the positioning area are selected randomly to minimize reduction in service life.

Moreover, with the activation or deactivation of a positioning function corresponding to an electronic shelf label in a controlled positioning area as designated by a task, a mode of low-power close-range signal broadcasting can be employed to reduce channel occupation.

An embodiment of the present application further provides a non-volatile readable storage medium in which one or more programs are stored, and, when applied to a device, may cause the device to execute instructions for the method steps in the embodiments of the present application.

An embodiment of the present application provides one or more machine-readable media in which instructions are stored, and, when executed by one or more processors, cause an electronic device to execute the methods described in one or more of the above embodiments. In the embodiment of the present application, the electronic device comprises various types of devices, such as a terminal device, a platform server (cluster), or the like.

Figure 7:
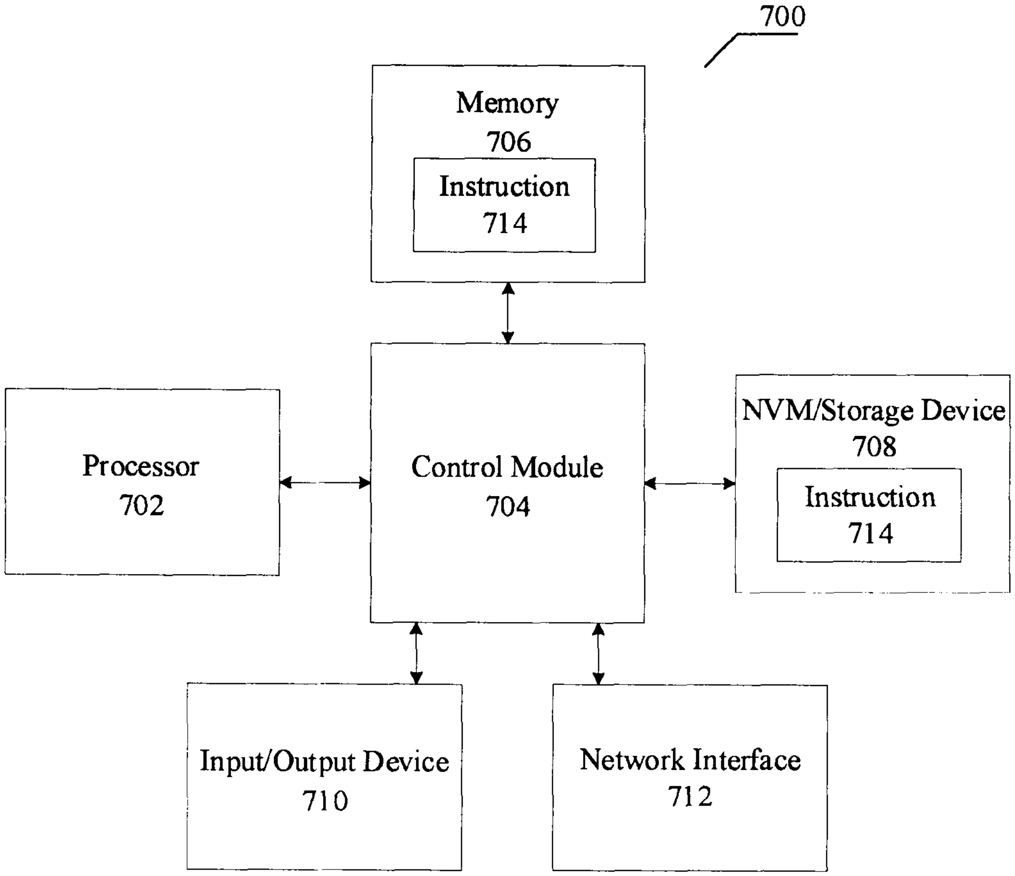
FIG. 7 is a schematic structural diagram of an apparatus provided in an embodiment of the present application.

The embodiments of the present disclosure may be implemented as apparatuses with desired configuration using any appropriate hardware, firmware, software, or any combination thereof, which may comprise a terminal device, a server (cluster), or other electronic devices. FIG. 7 schematically illustrates an exemplary apparatus 700 that may be used to implement various embodiments described in the present application.

For one embodiment, FIG. 7 illustrates an exemplary apparatus 700 having one or more processors 702, a control module (chipset) 704 coupled to at least one of processor(s) 702, a memory 706 coupled to control module 704, a non-volatile memory (NVM)/storage device 708 coupled to control module 704, one or more input/output devices 710 coupled to control module 704, and a network interface 712 coupled to control module 704.

Processor 702 may comprise one or more single-core or multi-core processors, and processor 702 may comprise any combination of general-purpose or specialized processors (e.g., a graphics processor, an application processor, a baseband processor, etc.). In some embodiments, apparatus 700 can serve as the terminal device, the server (cluster), or other devices described in the embodiments of the present application.

In some embodiments, apparatus 700 may comprise one or more computer-readable media with instructions 714 (e.g., memory 706 or NVM/storage device 708), and one or more processors 702 configured to execute instructions 714 in conjunction with the one or more computer-readable media to implement modules, thereby executing the actions described in the present disclosure.

For one embodiment, control module 704 may comprise any appropriate interface controller to provide any appropriate interface to at least one of processor(s) 702 and/or to any appropriate device or assembly in communication with control module 704.

Control module 704 may comprise a memory controller module to provide an interface to memory 706. The memory controller module may be a hardware module, a software module, and/or a firmware module.

Memory 706 may be used, for example, to load and store data and/or instructions 714 for apparatus 700. For one embodiment, memory 706 may comprise any appropriate volatile memory, such as an appropriate DRAM. In some embodiments, memory 706 may comprise a dual data rate type four synchronous dynamic random access memory (DDR4SDRAM).

For one embodiment, control module 704 may comprise one or more input/output controllers to provide interfaces to NVM/storage device 708 and input/output device(s) 710.

For example, NVM/storage device 708 may be used to store data and/or instructions 714. NVM/storage device 708 may comprise any appropriate non-volatile memory (e.g., a flash memory) and/or may comprise any appropriate non-volatile storage device(s) (e.g., one or more hard disk drives (HDDs), one or more compact disc (CD) drives, and/or one or more digital versatile disc (DVD) drives).

NVM/storage device 708 may comprise storage resources that are physically part of a device on which apparatus 700 is installed, or may be accessible by this device without necessarily being part of this device. For example, NVM/storage device 708 may be accessed through a network via input/output device(s) 710.

Input/output device(s) 710 may provide interfaces for apparatus 700 to communicate with any other appropriate devices, and input/output devices 710 may comprise a communication assembly, an audio assembly, a sensor assembly, or the like. Network interface 712 may provide an interface for apparatus 700 to communicate through one or more networks, and apparatus 700 may wirelessly communicate with one or more assemblies in a wireless network according to any of one or more wireless network standards and/or protocols, for example, accessing a wireless network based on communication standards such as WiFi, 2G, 3G, 4G, 5G, or a combination thereof for performing wireless communication.

For one embodiment, at least one of processor(s) 702 may be logically encapsulated with one or more controllers (e.g., memory controller modules) of control module 704. For one embodiment, at least one of processor(s) 702 may be logically encapsulated with one or more controllers of control module 704 to form a System in Package (SiP). For one embodiment, at least one of processor(s) 702 may be integrated on the same mold with the logic of one or more controllers of control module 704. For one embodiment, at least one of processor(s) 702 may be integrated on the same mold with the logic of one or more controllers of control module 704 to form a System on Chip (SoC).

In various embodiments, apparatus 700 may be, but is not limited to, a server, a desktop computing device, or a mobile computing device (e.g., a laptop computing device, a handheld computing device, a tablet computer, a netbook, etc.) and other terminal devices. In various embodiments, apparatus 700 may have more or fewer components and/or a different architecture. For example, in some embodiments, apparatus 700 comprises one or more cameras, keyboards, liquid crystal display (LCD) screens (including touch screen displays), non-volatile memory ports, multiple antennas, graphics chips, application-specific integrated circuits (ASICs), and speakers.

A detection apparatus may employ a main control chip as the processor or control module, sensor data, location information, or the like are stored in the memory or NVM/storage device, sensor groups may serve as the input/output devices, and a communication interface may comprise a network interface.

In terms of apparatus embodiments, given their substantial similarity to the method embodiments, the description is relatively simple. For relevant details, please refer to explanations of the method embodiments.

The various embodiments in this specification are described in a progressive manner, and each embodiment primarily elucidates its differences from others. For similarities among the various embodiments, please refer to each other.

The embodiments of the present application are described with reference to the flow charts and/or block diagrams of the methods, terminal devices (systems), and computer program products according to the embodiments of the present application. It should be understood that each procedure and/or block in the flow charts and/or block diagrams, as well as combinations of procedures and/or blocks in the flow charts and/or block diagrams, may be implemented by computer program instructions. These computer program instructions may be provided to a processor of a general-purpose computer, a specialized computer, an embedded processor, or other programmable data processing terminal device to produce a machine, such that the instructions executed by the processor of the computer or other programmable data processing terminal device produce an apparatus for implementing functions designated in one or more procedures in a flow chart and/or one or more blocks in a block diagram.

These computer program instructions may also be stored in a computer-readable memory that can guide a computer or other programmable data processing terminal device to work in a particular way, such that instructions stored in this computer-readable memory produce an article of manufacture including an instruction apparatus that implements functions designated in one or more procedures in a flow chart and/or one or more blocks in a block diagram.

These computer program instructions may also be loaded into a computer or other programmable data processing terminal device, such that a series of operating steps are executed on the computer or other programmable terminal device to generate computer-implemented processing, thereby enabling the instructions executed on the computer or other programmable terminal device to provide steps for implementing functions designated in one or more procedures in a flow chart and/or one or more blocks in a block diagram.

Although the preferred embodiments of the present application have been described, those skilled in the art may conduct additional changes and modifications to these embodiments once they have knowledge of the fundamental inventive concept. Therefore, the attached claims are intended to be interpreted as including the preferred embodiments and all changes and modifications that fall within the scope of the embodiments of the present application.

Finally, it should be further noted that relational terms mentioned herein, such as first and second are only used to distinguish one entity or operation from another entity or operation, and do not necessarily require or imply that any of such actual relationship or order exists between these entities or operations. Furthermore, terms such as "comprise", "include", or any other variants thereof are intended to encompass non-exclusive inclusion, such that a process, method, article, or terminal device comprising a series of elements comprises not only these elements, but also other elements that are not explicitly listed, or further comprises elements inherent in such process, method, article, or terminal device. Without further limitations, elements limited by a statement "comprising a . . . " do not exclude the existence of other identical elements in a process, method, article, or terminal device that comprises said element.

A detailed introduction is made above to a positioning method, a positioning apparatus, a positioning system, an electronic device, and a storage medium provided in the present application. Specific examples are applied herein to elaborate the principles and implementations of the present application. The above explanations of the embodiments are only for the purpose of helping understand the methods of the present application and the core ideas thereof; meanwhile, for persons with ordinary skills in the art, there may be changes in the specific implementations and application scopes according to the ideas of the present application. In summary, the content of this description should not be understood as a limitation of the present application.

What is claimed is:

1. A positioning system, comprising: a task management platform, a shelf label management platform, a terminal device, electronic shelf labels and a positioning server; wherein the task management platform determines a target task and task information of the target task;

the task management platform generates task processing information according to the task information, and sends the task processing information to the shelf label management platform and the terminal device;

the shelf label management platform controls, according to the task processing information, an electronic shelf label in a positioning area to transmit a beacon signal;

the terminal device receives, in the positioning area, signal data of the beacon signal;

the terminal device sends the signal data of the beacon signal to the positioning server;

the positioning server performs positioning according to the signal data to determine location information of the terminal device;

the positioning server sends the location information to the task management platform; and the task management platform determines task execution information of the target task according to the location information.

2. A positioning method, comprising:

determining a target task and task information of the target task;

generating task processing information according to the task information, and sending the task processing information;

receiving location information of a terminal device, the location information being determined by the terminal device by scanning a beacon signal of an electronic shelf label in a positioning area, and the positioning area being determined according to the task processing information; and determining task execution information of the target task according to the location information;

wherein the task processing information comprises shelf label control information, and the positioning area is determined by:

determining a positioning point on a task path according to the task processing information; and determining the positioning area according to the positioning point.

3. The method according to claim 2, wherein the determining the target task and the task information of the target task comprises:

acquiring the target task; determining at least one commodity object corresponding to the target task, and generating the task information based on the at least one commodity object.

4. The method according to claim 3, wherein the generating the task information based on the at least one commodity object comprises:

acquiring commodity information and location information of each of the at least one commodity object;

planning a task path for the target task according to the location information of each of the at least one commodity object, and determining corresponding operation information; and determining corresponding task information according to the commodity information, the location information of each of the at least one commodity object, the task path, and the operation information.

5. The method according to claim 2, wherein the generating the task processing information according to the task information, and sending the task processing information comprises:

generating positioning execution information according to the task information, and sending the positioning execution information to the terminal device;

generating the shelf label control information according to the task information, and sending the shelf label control information to a shelf label management platform; and sending the task information to the shelf label management platform and the terminal device.

6. The method according to claim 5, wherein the generating the positioning execution information according to the task information comprises:

determining a corresponding operation point on a task path according to location information of a commodity object;

determining operation time and operation content corresponding to the operation point according to operation information; and generating the positioning execution information according to the operation point on the task path, the operation time, and the operation content.

7. The method according to claim 5, wherein the generating the shelf label control information according to the task information comprises:

determining a corresponding positioning point on the task path according to an operation point on the task path;

determining a positioning time period corresponding to the positioning point, according to operation time corresponding to the operation point; and generating, according to the positioning point on the task path and the positioning time period, the shelf label control information.

8. The method according to claim 5, wherein the generating the shelf label control information according to the task information comprises:

determining a corresponding positioning point on a task path according to location information of a commodity object;

determining a positioning time period corresponding to the positioning point according to operation information; and generating, according to the positioning point on the task path and the positioning time period, the shelf label control information.

9. The method according to claim 7, wherein the step of determining the corresponding positioning point on the task path comprises:

on condition that a plurality of operation points or location information of a plurality of commodity objects are in one positioning area, merging the plurality of operation points.

10. The method according to claim 2, further comprising:

determining time information corresponding to the location information;

determining staying time of the terminal device in a corresponding positioning area according to the time information; and recording the staying time.

11. The method according to claim 2, further comprising:

generating warning information on condition that it is detected that staying time of the terminal device in the positioning area exceeds a staying threshold.

12. A positioning method, comprising:

receiving task processing information of a target task;

determining a positioning area according to the task processing information; and determining an electronic shelf label group according to the positioning area, controlling an electronic shelf label in the electronic shelf label group to send a beacon signal to position, according to the beacon signal, location information of a terminal device, and determining task execution information of the target task according to the location information;

wherein the task processing information comprises shelf label control information; and the determining the positioning area according to the task processing information comprises:

determining a positioning point on a task path according to the task processing information; and determining the positioning area according to the positioning point.

13. The method according to claim 12, wherein the determining the electronic shelf label group according to the positioning area comprises:

selecting a plurality of electronic shelf labels in the positioning area, the electronic shelf label group comprising the plurality of electronic shelf labels;

wherein the controlling the electronic shelf label in the electronic shelf label group to send the beacon signal comprises:

determining a positioning time period corresponding to the positioning point; and controlling, within the positioning time period, the plurality of electronic shelf labels to send beacon signals.

14. The method according to claim 12, wherein the controlling the electronic shelf label in the electronic shelf label group to send the beacon signal comprises:

receiving a positioning completion indication corresponding to a target operation point; and sending a positioning activation indication to an electronic shelf label group in a positioning area corresponding to a next operation point, and controlling an electronic shelf label in the electronic shelf label group to send a beacon signal.

15. A positioning method, comprising:

receiving task processing information of a target task;

displaying the target task according to the task processing information;

scanning, on condition that an operation point is reached, beacon signals of electronic shelf labels, and receiving signal data, the electronic shelf labels comprising a plurality of electronic shelf labels in an electronic shelf label group in a positioning area; and sending the signal data to determine, according to the signal data, location information and reporting the location information, and determining task execution information of the target task according to the location information;

wherein the task processing information comprises shelf label control information, and the positioning area is determined by:

determining a positioning point on a task path according to the task processing information; and determining the positioning area according to the positioning point.

16. The method according to claim 15, wherein the task processing information comprises positioning execution information, and the displaying the target task according to the task processing information comprises:

displaying, according to the positioning execution information, an operation point, commodity information, and operation content;

wherein the method further comprises:

determining location information of a terminal device according to positioning data; and sending the location information of the terminal device.

17. The method according to claim 15, further comprising:

sending a positioning completion indication after completing a corresponding task at the operation point.

18. The method according to claim 15, further comprising:

acquiring reminder information and displaying the reminder information, the reminder information comprising operation reminder information and/or warning information.

19. A positioning method, comprising:

receiving signal data of a terminal device, the signal data being acquired by the terminal device by scanning beacon signals of electronic shelf labels at an operation point, and the electronic shelf labels comprising a plurality of electronic shelf labels in an electronic shelf label group in a positioning area;

performing positioning processing according to the signal data and location information of a corresponding electronic shelf label to determine location information of the terminal device; and sending the location information to determine task execution information of a target task according to the location information;

wherein the positioning area is determined by:

determining a positioning point on a task path according to task processing information of the target task; and determining the positioning area according to the positioning point.

* * * * *